United States Patent
Bell et al.

(10) Patent No.: US 8,068,789 B2
(45) Date of Patent: Nov. 29, 2011

(54) SURVEY DEVICE

(75) Inventors: Alexander Bell, Uralla (AU); Simon Lott, Armidale (AU); Neil Murray, Petrie (AU)

(73) Assignee: Data Info Tech Pty Ltd, Armidale, New South Wales (AU)

( * ) Notice: Subject to any disclaimer, the term of this patent is extended or adjusted under 35 U.S.C. 154(b) by 643 days.

(21) Appl. No.: 11/922,839

(22) PCT Filed: Sep. 26, 2006

(86) PCT No.: PCT/AU2006/001404
§ 371 (c)(1),
(2), (4) Date: Nov. 13, 2008

(87) PCT Pub. No.: WO2007/041756
PCT Pub. Date: Apr. 19, 2007

(65) Prior Publication Data
US 2009/0089015 A1    Apr. 2, 2009

(30) Foreign Application Priority Data
Oct. 11, 2005    (AU) .................................. 2005905602

(51) Int. Cl.
*H04B 17/00* (2006.01)
(52) U.S. Cl. ................. 455/67.11; 455/12.1; 455/115.1; 455/456.1
(58) Field of Classification Search ................. 455/2.01, 455/403, 404.2, 414.1, 414.2, 456.1, 9, 11.1, 455/12.1, 67.11, 115.1, 456.2; 702/188
See application file for complete search history.

(56) References Cited

U.S. PATENT DOCUMENTS

| | | | |
|---|---|---|---|
| 5,553,407 A | 9/1996 | Stump | |
| 5,903,235 A | 5/1999 | Nichols | |
| 6,094,625 A | 7/2000 | Ralston | |
| 6,121,923 A * | 9/2000 | King | 342/357.42 |
| 6,608,672 B1 * | 8/2003 | Shibusawa et al. | 356/73 |
| 2001/0039489 A1 | 11/2001 | Ford et al. | |
| 2003/0068935 A1 * | 4/2003 | Dubois | 441/6 |
| 2003/0088452 A1 * | 5/2003 | Kelly | 705/10 |
| 2004/0198438 A1 * | 10/2004 | Song et al. | 455/556.1 |
| 2005/0141302 A1 * | 6/2005 | Maeda et al. | 365/200 |
| 2006/0018642 A1 | 1/2006 | Chaplin | |
| 2006/0148400 A1 * | 7/2006 | Farrow | 455/3.02 |
| 2006/0161349 A1 | 7/2006 | Cross et al. | |

(Continued)

FOREIGN PATENT DOCUMENTS

AU    2003200202 A1    8/2005

(Continued)

OTHER PUBLICATIONS

International Search Report for PCT/AU2006/001404 dated Dec. 7, 2006, 4 pp.

(Continued)

*Primary Examiner* — Cong Tran
(74) *Attorney, Agent, or Firm* — Weaver Austin Villeneuve & Sampson LLP

(57) ABSTRACT

A survey device, including: an antenna to receive at least one wireless signal; an interface to receive environmental data; one or more processors to determine spatial data using the at least one wireless signal, and to produce collocated data by combining the spatial data and the environmental data; and, an output device to output the collocated data.

17 Claims, 5 Drawing Sheets

U.S. PATENT DOCUMENTS

2007/0042716 A1* 2/2007 Goodall et al. ............ 455/67.11
2007/0268852 A1* 11/2007 Stegmaier et al. ............ 370/328

FOREIGN PATENT DOCUMENTS

| CA | 2 191 954 A | 12/1995 |
|---|---|---|
| CA | 2 305 633 A1 | 10/2001 |
| JP | 2006-133173 | 5/2006 |
| JP | 2006-133173 A | 5/2006 |
| WO | WO 98/10246 A1 | 3/1998 |

OTHER PUBLICATIONS

Written Opinion of the International Searching Authority for PCT/AU2006/001404 dated Dec. 7, 2006, 5 pp.

* cited by examiner

SURVEY DEVICE

TECHNICAL FIELD

The present invention generally relates to devices for surveying, mapping or the like, and more particularly to survey devices able to obtain or calculate relatively high accuracy positioning or spatial information from electromagnetic signals.

BACKGROUND ART

Accurate surveying for use in survey and Geographic Information System (GIS) applications requires relatively high accuracy GPS or other satellite positioning systems. To be assured of the accuracy required for these applications, it is known to use differential correction (DGPS) and RTK processes to increase the accuracy of a calculated position. Such systems require a GPS antenna and associated equipment, capable of receiving DGPS or RTK signals, typically housed in a back-pack worn by an operator due to the weight and/or size of the antenna and associated equipment.

Furthermore, known DGPS or RTK systems provide an accurate position only and do not allow or provide for the incorporation of additional data related to the calculated position. For example, known systems cannot readily incorporate chemical, physical, biological, geographical, geological, environmental, etc., data (such as soil colour, soil type, vegetation type, geographic features, management features, etc.) related to the calculated position.

Presently, such additional data is normally collected by hand, for example by observation or by reading a display on a sampling device, and recorded on paper or in a separate computer, for subsequent processing in an office after the field work has been completed. The calculated positions and any manually obtained additional data must be subsequently combined and then analysed. This can introduce the possibility of errors if calculated positions are not correctly mapped to the additional data. Moreover, analysis of data typically cannot begin until a person, such as a surveyor, has physically completed a field survey and returned to an office to provide the raw data, which can often introduce a delay of from a few days to several weeks or more.

This identifies a need for a survey device which addresses or at least ameliorates problems inherent in the prior art.

The reference to any prior art in this specification is not, and should not be taken as, an acknowledgment or any form of suggestion that such prior art forms part of the common general knowledge.

DISCLOSURE OF INVENTION

According to a first broad form, the present invention provides a survey device, including: an antenna for receiving at least one wireless signal; an interface for receiving environmental data; and, one or more processors for determining spatial data using the at least one wireless signal, and for producing collocated data by combining the spatial data and the environmental data. Preferably, there is also provided an output device for outputting the collocated data.

In a particular form the survey device is a handheld survey device.

In a further particular form the output device is used for transferring the collocated data to a database, and/or for receiving information from remote sources.

In still a further particular form the output device is used for wirelessly transmitting the collocated data to be stored in a remote database.

According to further optional aspects, provided by way of example only, the at least one wireless signal is one or more signal type selected from the group of: a Global Positioning System (GPS) signal; a Differential Global Positioning System (DGPS) signal; a High Performance (HP) signal; a Satellite Differential GPS (SDGPS) signal; and a Real Time Kinematic (RTK) signal. Other types of wireless signal could also be utilised, such as GPS Over Internet, Galileo or Glonass.

The antenna may be any type of antenna or receiver capable of receiving a GPS signal, a DGPS signal, a HP signal, a SDGPS signal, a RTK signal, or the like, and/or any other type of wireless signal that facilitates determination of a spatial position of, or relative to, the antenna or associated equipment.

In accordance with specific optional embodiments, provided by way of example only: the spatial data is a three dimensional position; the spatial data is a two dimensional position; the environmental data relates to chemical, physical, biological, geographical, geological or environmental properties or aspects; and/or the collocated data includes temporal data.

Preferably, but not necessarily, the survey device includes a user display module.

Optionally, more than one antenna is provided.

Optionally, at least one of the more than one antenna is an external antenna

Optionally, a Radio Frequency (RF) switch is provided to switch between different antennas.

Also optionally, at least one RF amplifier is provided.

According to further optional aspects, provided by way of example only, the interface is able to receive the environmental data via one or more of: a cable; a serial cable; a parallel cable; an optical fibre; a USB; a wireless data transmission protocol; bluetooth; infrared; and/or IEEE 802.11.

Optionally, the interface is, or additionally provides, a user/survey device interface.

According to still further optional aspects, provided by way of example only, the output device is able to output the collocated data via one or more of: a cable; a serial cable; a parallel cable; an optical fibre; a USB; a wireless data transmission protocol; bluetooth; infrared; IEEE 802.11; GSM; CDMA; and/or 3G.

Preferably, but not necessarily, the output device includes a mobile phone module.

In another particular, but non-limiting, form the survey device is substantially encased in a water resistant casing.

According to a second broad form, the present invention provides a computer program product for use with a survey device, the computer program product adapted to: obtain data representative of at least one wireless signal, the at least one wireless signal received by an antenna; obtain data representative of environmental data, the environmental data received by an interface; determine spatial data using the data representative of at least one wireless signal; and, combine the determined spatial data and the environmental data to produce collocated data.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
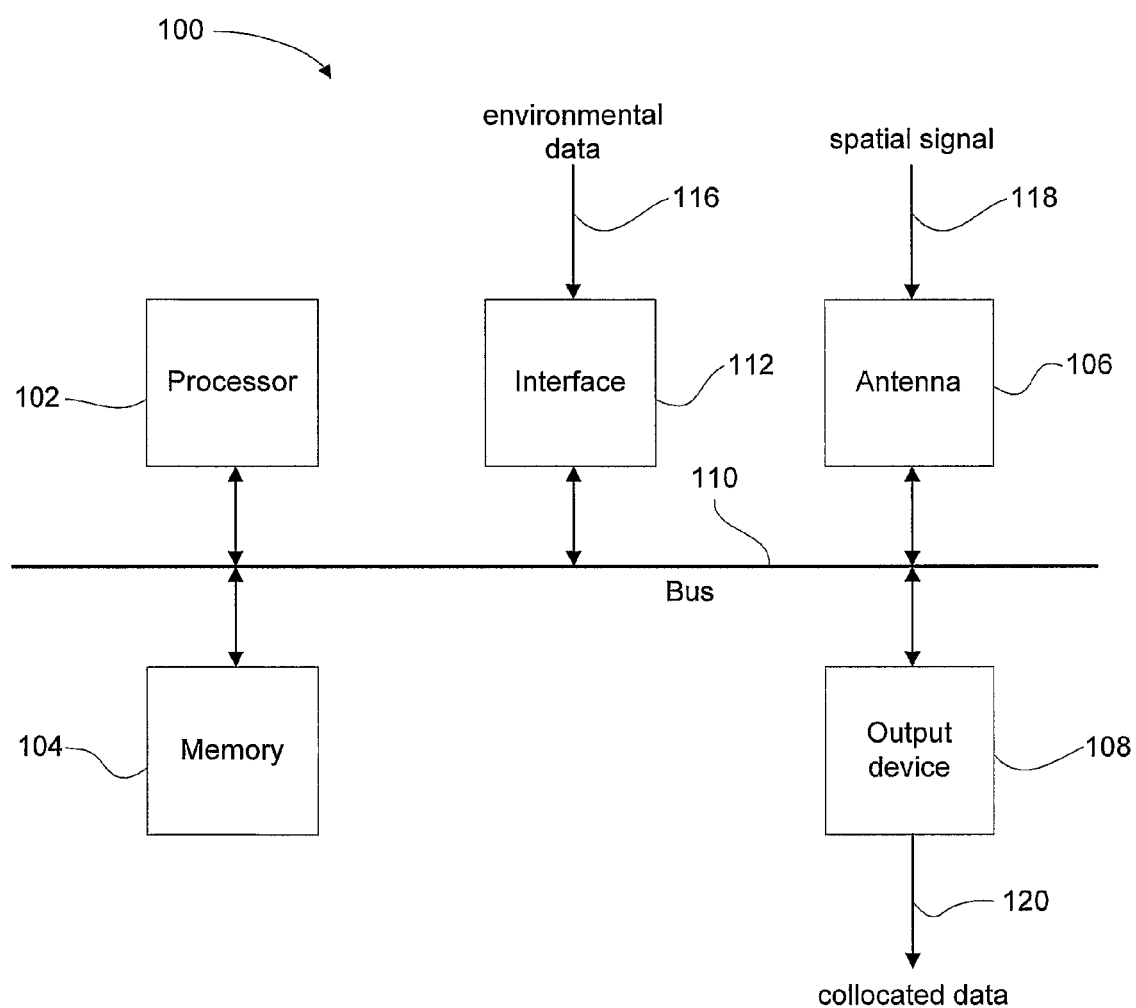
FIG. 1 illustrates a functional block diagram of an example survey device.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

PREFERRED EMBODIMENT

A particular embodiment of the present invention is shown in FIG. 1. Survey device 100 generally includes at least one processor 102, or processing unit or plurality of processors, memory 104, at least one antenna 106 and at least one output device 108, coupled together via a bus or group of buses 110. In certain embodiments, antenna 106 and output device 108 could be the same component and/or serve dual functions.

Survey device 100 could be, wholly or in part, a type of processing system, computer or computerised device, mobile, cellular or satellite telephone, portable computer, tablet PC, Personal Digital Assistant (PDA), 'smart phone' or any other similar type of digital electronic device. The capability of such a device to request and/or receive information or data can be provided by software, hardware and/or firmware. Survey device 100 may include or be associated with various other devices, for example a local data storage device such as a solid state drive.

At least one interface 112 is also provided for coupling survey device 100 to one or more peripheral devices, for example interface 112 could provide for connection to a peripheral device via one or more types of cable, such as serial, parallel, optical, USB, etc., and/or via one or more types of wireless data transmission protocols, such as bluetooth, infrared, IEEE 802.11, etc. One or more peripheral devices (not illustrated) obtain environmental data 116 which is input to survey device 100 via interface 112. Survey device 100 may receive environmental data 116 either directly from the one or more peripheral devices via interface 112 or by an operator inputting environmental data 116 via interface 112 when interface 112 acts as a user/survey device interface.

Thus, interface 112 may be an interface used by a human user of survey device 100. A user could manually input observed or measured environmental data 116 using a user/survey device interface. For example, the user/survey device interface, which could be provided in conjunction with other types of interface as previously discussed, could be a keyboard, a pointing device such as a pen-like device, stylus or mouse, a touch screen for use with a stylus, and/or an audio receiving device for voice controlled activation such as a microphone.

A peripheral device can be one of many types of chemical, physical, biological, geographical, geological, environmental, etc., sampling devices. For example, environmental data 116 collected by a peripheral device from a particular spatial position could include: soil colour, soil type, vegetation type, geographic features, management features, etc. A wide variety of types of environmental data 116 are possible and generally any type of sampling device could be interfaced with survey device 100.

Memory 104 can be any form of memory device, for example, volatile or non-volatile memory, solid state storage devices, magnetic devices, etc. Processor 102 could include more than one distinct processing device, which could for example handle different functions of survey device 100.

One or more antenna 106 receive one or more spatial signals 118, which can include, for example: a GPS signal; a DGPS signal; a HP signal; a SDGPS signal; a RTK signal; either individually or in any combination; and/or any other type of wireless signal that facilitates determination of a spatial position of, or relative to, the antenna or associated equipment.

Output device 108 sends or transmits collocated data 120 (which may also be stored in memory 104) and can include for example: a data port; a USB port or any of the modes of data transmission as described for interface 112, a mobile or cellular telephone to transmit the collocated data, a data transmitter or further antenna, a modem or wireless network adaptor, etc.

For example, a mobile phone module can be provided to transmit collocated data via GSM, CDMA, 3G, etc. mobile phone networks, depending on available phone network coverage. A user could view collocated data output, or an interpretation of the data output on, for example, a display of the survey device 100, a remote monitor or using a printer. Output device 108 could also be used to selectively or periodically store collocated data 120 in a remote or local database.

In use, survey device 100 receives spatial signal(s) 118 via antenna(s) 106 and processor(s) 102 converts spatial signal(s) into spatial data which can be stored in memory 104. Memory 104 could be dedicated processor memory and/or a more permanent data store, for example including a local database to store data. Interface 112 allows wired and/or wireless communication between processor(s) 102 and peripheral components that may serve a specialised purpose. Processor(s) 102 receives environmental data 116 via interface 112 and environmental data 116 can also be stored in memory 104. Processor(s) 102 collocates spatial data, obtained from the spatial signal 118, and environmental data 116, either directly as received or from memory 104. Collocated data 120 can be stored in memory 104 (for subsequent retrieval) and/or transmitted to a remote computer system via output device 108. It should be appreciated that survey device 100 may incorporate any form of computerised terminal, specialised hardware, or the like.

FURTHER EXAMPLES

The following examples provide a more detailed discussion of particularly preferred embodiments. The examples are intended to be merely illustrative and not limiting to the scope of the present invention.

In a further particular embodiment, the survey device is a Differential Global Positioning System (DGPS) enabled, handheld data capture device, optionally encapsulated in a substantially water resistant protective casing. The survey device incorporates a microcomputer, or the like, which enables control of the DGPS, plus capture of spatial, and optionally time tagged, data that may be physically or remotely synchronised with a database. A GPS antenna incorporated within the survey device can be enabled to receive DGPS signals, which should give the survey device an accuracy of +/−100 mm. The survey device and associated software links the spatial data collected from the DGPS with environmental data related to characteristics of the sampled position. It is possible to attach or incorporate RTK enabled devices to allow capture of RTK signals which provide an accuracy of +/−10-50 mm. There is no requirement for additional equipment to be provided in a backpack, or other handheld attachments, however other equipment may be attached if required.

In a further particular embodiment, the handheld survey device includes: a water resistant protective outer casing; a microcomputer encompassing display; communications; operating software for data capture; data storage and system control; a miniature GPS antenna/receiver capable of receiving GPS, DGPS, HP; SDGPS and/or RTK signals; a miniaturised high performance power source that may have one or more voltage converters; a switching connection that allows switching between an external GPS, DGPS or RTK antenna/receiver or any spatial locating device of choice and an internal GPS, DGPS or RTK antenna; and, software that allows the synchronising of data either by physical connection or a remote connection between the survey device and another computer, server or database. The microcomputer used could be a Personal Digital Assistant (PDA), smart phone, Tablet PC or some similar device.

Figure 2:
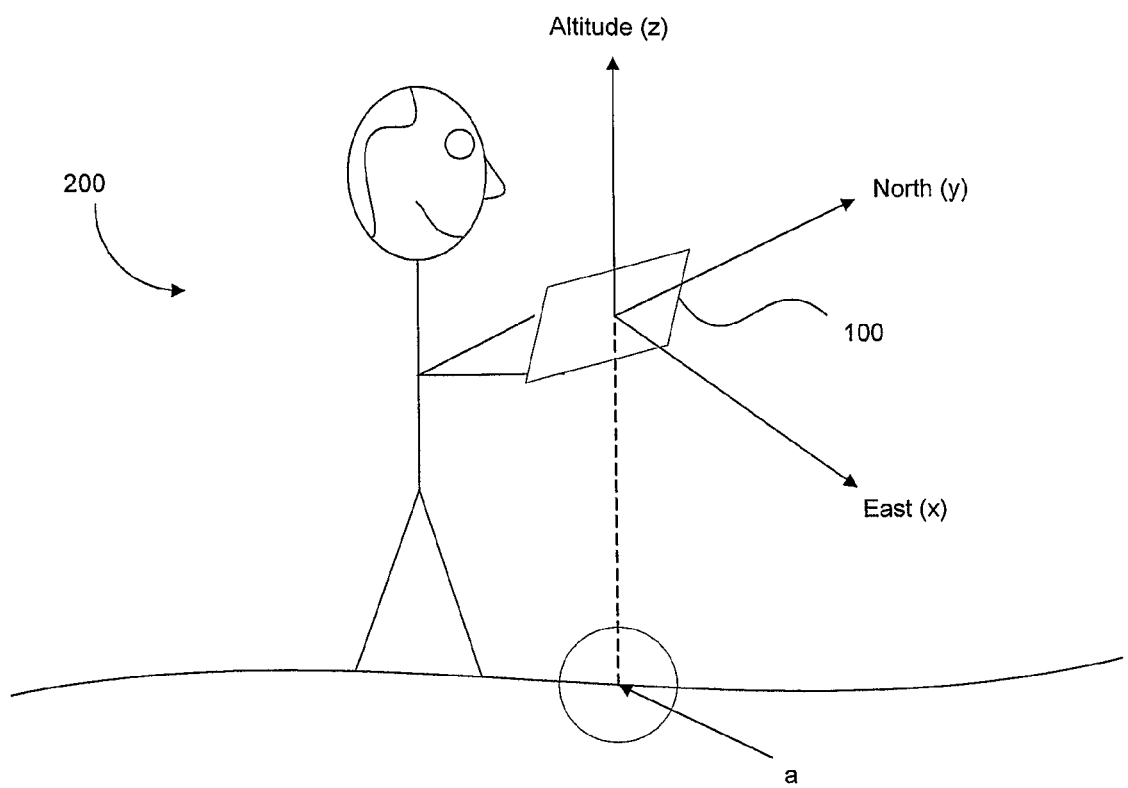
FIG. 2 illustrates a hand-held survey device in use.

Referring to FIG. 2, survey device 100 is able to define a user's position in northing-easting or latitude-longitude coordinates and additionally obtains an altitude measurement if required, thereby providing a data string that is representative of the position of survey device 100.

The data string defines the position of survey device 100 in space in (y, x, z) coordinates, as illustrated in FIG. 2. Survey device 100 additionally provides for the attachment or combination of environmental data 116 relating to various types of conditions or characteristics at or near position (y, x, z). Environmental data 116 can be considered an additional data string $(a_1, a_2, a_3, \ldots)$.

Environmental data $(a_1, a_2, a_3 \ldots)$ can then be combined with spatial data (y, x, z) to obtain collocated data 120 which could be stored in the form $(y, x, z, a_1, a_2, a_3, \ldots)$ or as permutations thereof, or in other possible combined forms such as a two dimensional array or higher order matrix. The environmental data could relate to either a three dimensional position (y, x, z) or a two dimensional position (y, x) on the earth's surface, as is illustrated by point 'a' in FIG. 2. Survey device 100 uses GPS, DGPS or RTK signals, or the like, received from GPS satellites and/or ground stations to calculate (y, x, z) coordinates.

In use, survey device 100 is held by user 200, survey device 100 being a handheld device, over a desired position 'a', preferably at a predetermined height. Once survey device 100 is placed over the desired position, the data relating to that position can be collected. This data could relate to environmental conditions that prevail at that particular position. Once all required data is collected, the position can be logged and all data can be stored in memory 104, transmitted via output device 108, or if survey device 100 is out of wireless communication range, subsequently transferred to a database. Memory 104, or additional separate memory in survey device 100, can provide a local database to store data.

Figure 3:
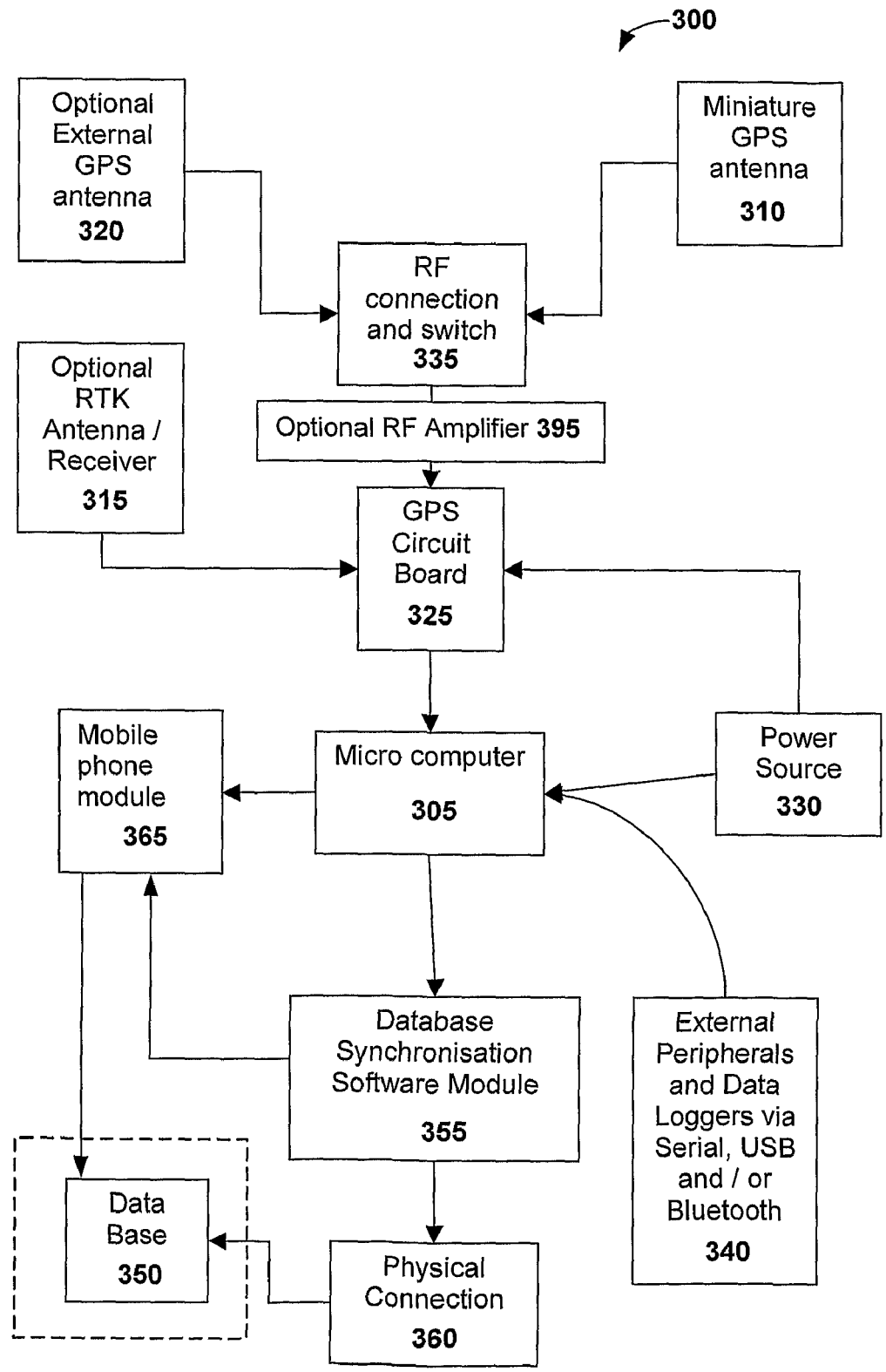
FIG. 3 illustrates a more detailed functional block diagram of an example survey device.
Figure 4:
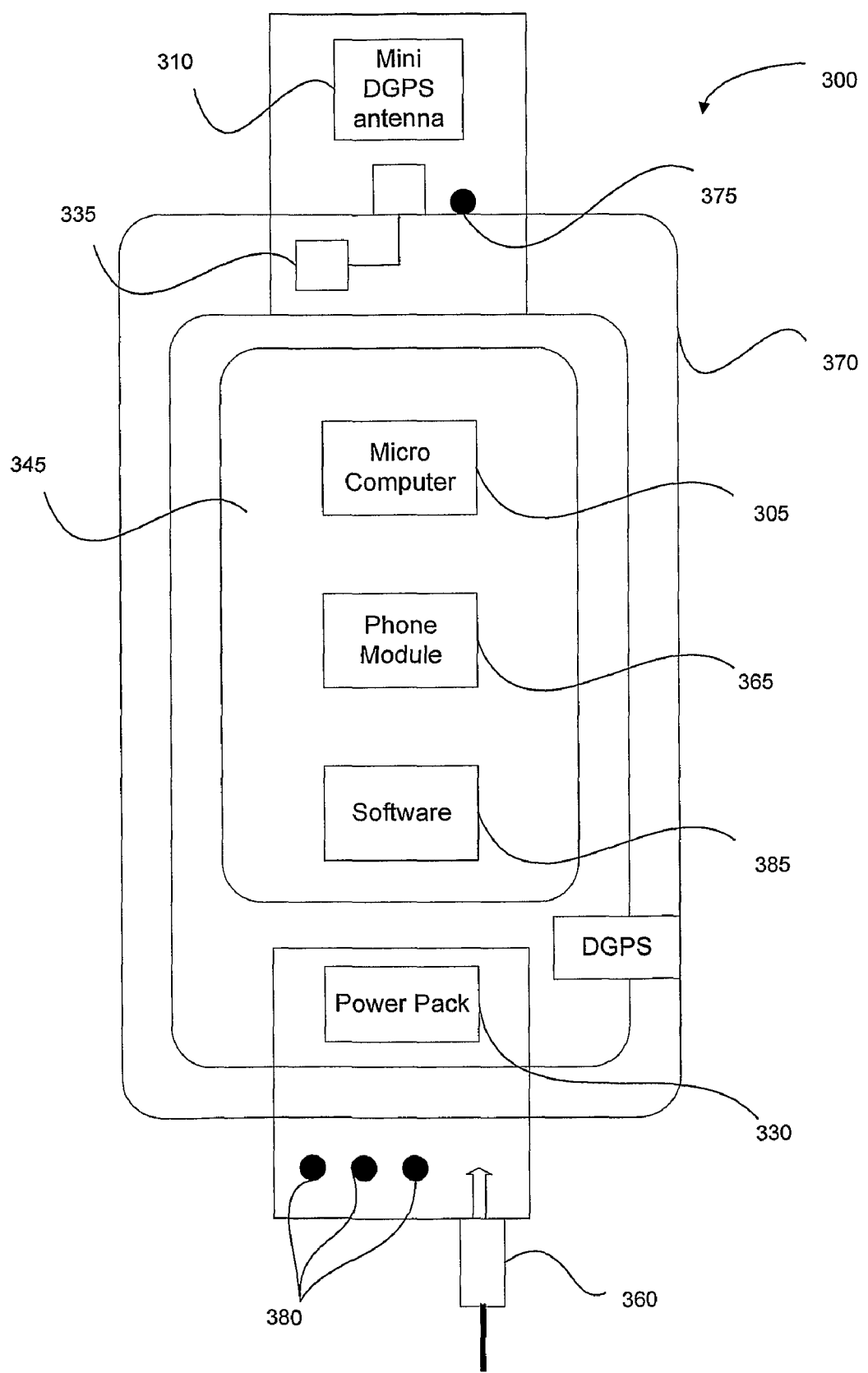
FIG. 4 illustrates an overview of selected components of an example survey device; and, FIG. 5 illustrates a flow diagram of an example method for operating a survey device.

Referring to FIGS. 3 and 4, additional components of a survey device are illustrated. Survey device 300 includes a microcomputer 305 connected to a GPS, DGPS or RTK antenna/receiver. In FIG. 3, more than one antenna can be provided including a miniature GPS antenna 310, a RTK antenna/receiver 315 and an external GPS antenna 330. A GPS circuit board 325 capable of receiving GPS, DGPS, SDGPS and RTK signals is provided. Power source 330 is also provided which provides electrical power to GPS circuit board 325. The miniature GPS antenna 310, capable of receiving GPS, DGPS and SDGPS signals is fitted internally to device 300. Device 300 is also capable of receiving GPS, DGPS and RTK signals from antenna 315 or external antenna 320. To enable external antenna 320 a Radio Frequency (RF) switch 335 is provided and is used to alternate between external antenna 320 and internal antenna 310. An optional RF amplifier 395 is also provided to boost the signal strength between the antenna 310 and GPS circuit board 325.

In a particular example embodiment the antenna may be a miniature device capable of receiving GPS, DGPS, SDGPS and HP signals. The miniature antenna contains a signal filter, a signal amplifier and associated circuitry fully enclosed within a ceramic outer casing. The antenna may be constructed from ceramic materials arranged in multiple layers and can be housed within the outer water proof casing of the device.

Power source 330 may be any type of power supply device able to provide sufficient power and preferably be of dimensions suitable for use in a handheld device. If power source 330 does not provide the correct voltage, then one or more voltage converters may be fitted to allow for correct power supply characteristics to various internal components of survey device 300.

Power source 330 may be a miniaturised power pack capable of supplying power to each of the components of survey device 300, for example a rechargeable lithium ion battery pack, a lithium polymer battery pack, a micro-motor power pack, a miniature fuel cell power pack, a capacitor power pack, or any other suitable power source capable of supplying the required electrical power. Power source 330 may incorporate more than one specific type of power source to provide power redundancy. This allows variable power supplies, such as photovoltaic cells, to be used. Preferably, power source 330, or at least one of the power sources constituting a combined power source 330 with redundancy, is rechargeable and may be recharged using an appropriate charging device, or can be recharged using a motor vehicle's battery. It is also possible to power survey device 300 from an external power source.

It is also possible to attach and download data from other data collection or sampling devices 340 via a variety of data transmission methods. Peripheral data collection or sampling devices may include data loggers, sensing equipment, keyboards, cameras, other GPS devices, etc. Data transmission methods could include serial or USB ports, or wireless transmission methods such as bluetooth, infrared, WiFi, etc.

In a particular example use, the peripheral sampling device may be a data logger connected to any external sampling device(s). The data loggers may include those manufactured by, for example: Campbell Scientific; Monitor Sensors; or Environdata. The external sampling devices could be used to measure, for example: ambient temperature; relative humidity; incoming solar radiation; wind speed and direction; rainfall; water depth; fluid flow rate; dissolved oxygen; etc. These sampling devices are generally used. to monitor environmental parameters such as weather, plant growth rates, water flow rates and water volume within particular water storages.

Microcomputer 305 is provided with software applications that can be set for automatic shutdown if microcomputer 305 remains idle for a predetermined period of time. Separate software can also allow survey device 300 to be shut down and reset, for example using a display module 345 of survey device 300 as a user/device interface.

It is also possible to attach other physical locating devices such as a surveying tripod, a walking stick locater, a monopod device, etc., to further increase the accuracy of the spatial data collected.

Survey device 300, and an associated software application (i.e. computer program product) executable on microcomputer 305, allows an operator to capture spatially accurate data and combine the spatial data with environmental data relating to conditions or characteristics at a sampled position. The software application utilises software job keys with a time expiry, which forces operators to synchronise survey device 300 with a central database 350, which is not part of survey device 300. This synchronisation is achieved by using a database synchronisation software module 335 and by connecting the microcomputer 305 to a computer or server containing or in communication with central database 350. For example, the connection could be obtained by a physical connection 360, such as a cable, or via wireless data transmission means as previously described.

Survey device 300 is additionally preferably provided with a mobile phone module 365. Thus, mobile phone module 365 can be used to transmit data from microcomputer 305 or memory to database 350 when survey device 300 is remote to database 350. This allows collocated data to be remotely transmitted to database 350 whilst an operator continues to conduct surveys in the field.

Survey device 300 can also be provided with a protective casing 370 which is preferably substantially water resistant. Connection 375 for external antenna 320 can also be provided as illustrated in FIG. 4. Various connections 380 can also be provided for connecting external collecting or sampling devices.

Figure 5:
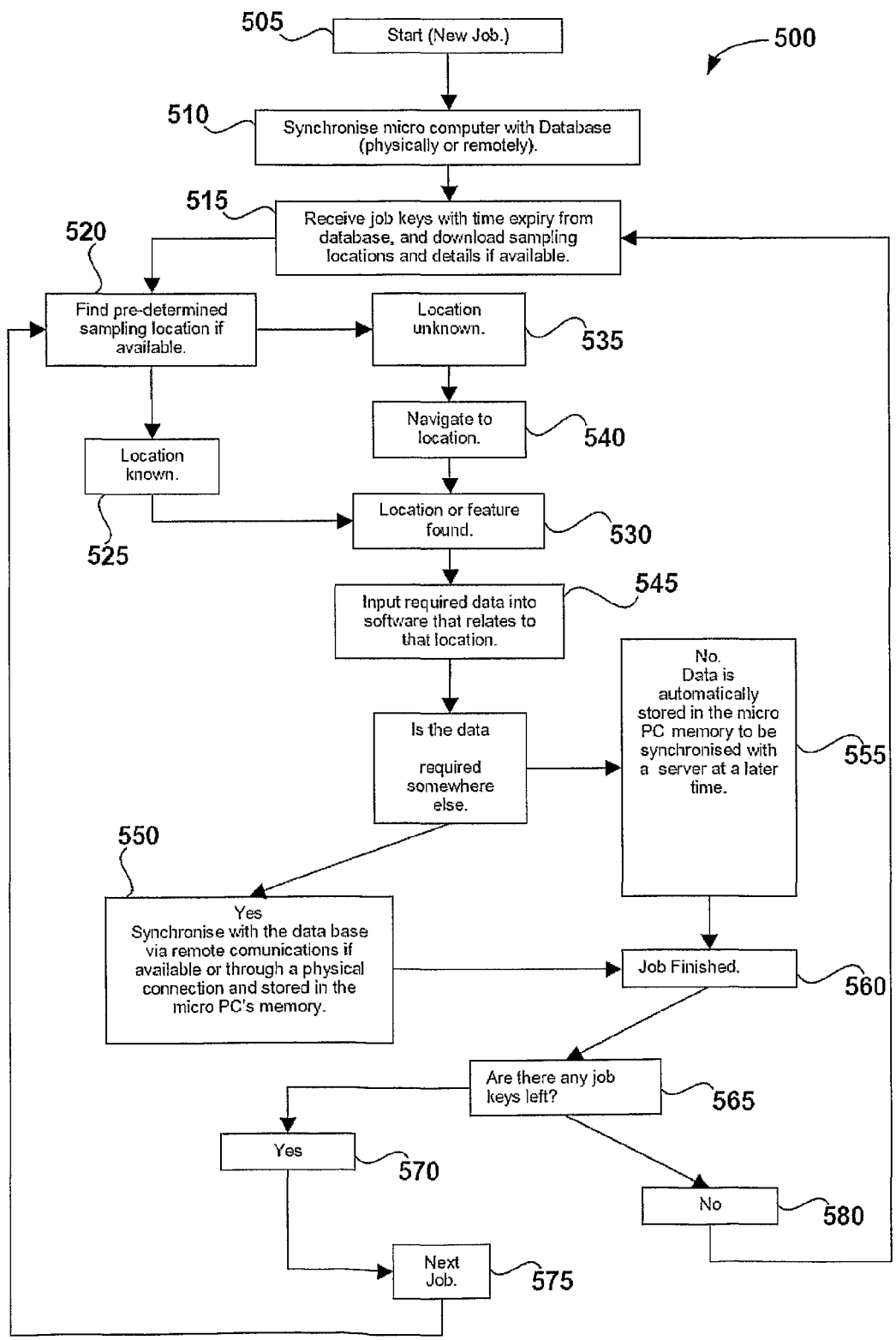

Referring to FIG. 5, there is illustrated a method 500 for operation of software 385 provided in survey device 300. To initiate software 385, the software is selected at step 505 from a startup menu available on the microcomputer. Once the software has been started the data is synchronised at step 510 with database 350, either by physical connection or remote access. During the synchronisation process, microcomputer 305 receives a number of job keys from the database. These job keys, received at step 515, have a time expiry attached to them which preferably forces the user to synchronise with the central database prior to the job key's expiry time. It is also possible to download predetermined sampling locations and information about the predetermined sampling locations including spatial data (y, x, z), together with conditions associated with that position ($a_1$, $a_2$, $a_3$, . . . ) from the central database during the synchronisation process. This is illustrated at step 520.

If the sampling location has been predetermined and is a known location (step 525) then the position and/or the environmental data are located at step 530 in the database. If there are no predetermined sampling locations as illustrated at step 535, the user can locate the desired sampling position and then log that particular position using the GPS module (step 540). Once the sampling position has been found, it is possible to then input the required environmental data that relates to that position at step 545. The data collected from a particular position could include, for example: soil colour; soil type; vegetation type; geographic features; management features; or a wide variety of other types of information.

If survey device 300 is within mobile phone coverage, it is then possible to upload the collected data to the central database, combined with the sampling position, and thereby synchronise data in microcomputer 305 with the central database 350. This is illustrated at step 550. Alternately, if there is no mobile phone coverage or if the data is not required at the central database for a particular reason for some time, the data can be stored in memory to be synchronised with database 350 at a later time, as illustrated at step 555. It is possible to synchronise the data with the central database either physically or remotely at any point in the future prior to a particular job key's expiry date.

Once the synchronisation has been completed, that particular job is identified as finished at step 560. If the microcomputer has more job keys sorted within the software, as can be checked at step 565, it is then possible to collect data relating to other sampling positions using the aforementioned procedure and as is illustrated at steps 570 and 575. If there are no more job keys available within the software, as at step 580, then microcomputer 305 should be synchronised with central database 350 prior to continuing. Once further job keys have been uploaded from the database or associated server, it is possible to continue onto other sampling locations.

A local database may be provided in survey device 300, associated with microcomputer 305, and can allow the capture and storage of both the spatial data and the environmental data that has been collected, and thus enables the user to synchronise this data with a larger central database 350. Once the data has been synchronised with the central database 350, reports can be generated concerning the spatial data (y, x, z) and the associated environmental data ($a_1$, $a_2$, $a_3$, . . . ), together with the time of data collection which can be automatically logged and combined with or appended to collocated data sent to database 350. Thus, collocated data may be obtained in the form (i, y, x, z, $a_1$, $a_2$, $a_3$, . . . ) where t is the time of sampling. The time of data collection could be obtained from a variety of sources such as an internal clock of microcomputer 305 or via a signal received by an antenna of survey device 300.

In a particular non-limiting example, the software interface provided within the device is a VB.NET/C#.NET Windows compact framework application which interfaces with a SQL Server CE database for use on Windows CE platforms. The GPS operational software may be StorrnSource.GPS. In addition, OpenNETCF.Multimedia.Audio software can be provided within the survey device to run audio visual help files. Example pseudo code that can be used to enable the GPS satellites and begin receiving GPS signal is presented hereinafter.

GPS
Report Comm Status
OnGPSFix*Run when GPS makes a fix
OnSatellites*Report on satellites found
OnMovement*Run when GPS advises movement
OnGPSPort*Turns on and off GPS and Satellite display The survey device can be utilised in a wide variety of applications, including but not restricted to, for example: Mining; Agriculture; Tourism; Education; Inventory control; Sales; Government; Military; Medicine; Survey; Real Estate; Human Resources; Law Enforcement; Emergency Services; Building Industry; Fisheries; Forestry; National Parks; Recreation; Engineering; Roads and Traffic; Environmental Monitoring; Geology; and/or Seismology.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A handheld survey device, comprising:
    an antenna for receiving at least one wireless signal;
    at least one interface configured to receive environmental data from at least one interchangeable peripheral device that produces the environmental data, wherein the at least one interchangeable peripheral device is selected from a plurality of different types of interchangeable peripheral devices, and wherein the environmental data correlates with environmental conditions in the local vicinity of the handheld survey device;
    one or more processors configured to:
        determine spatial data using the at least one wireless signal, and
        produce collocated data by combining the spatial data and the environmental data; and
    an output device configured to wirelessly transmit the collocated data.

2. The survey device as claimed in claim 1, wherein the interchangeable peripheral device is a sampling device selected from the group consisting of chemical sampling, physical sampling, biological sampling, geographical sampling, geological sampling, and environmental sampling.

3. The survey device as claimed in claim 1, wherein the output device is used for wirelessly transmitting the collocated data to be stored in a remote database.

4. The survey device as claimed in claim 1, wherein the at least one wireless signal is one or more signal type selected from the group consisting of a Global Positioning System (GPS) signal, a Differential Global Positioning System (DGPS) signal, a High Performance (HP) signal, a Satellite Differential GPS (SDGPS) signal, and a Real Time Kinematic (RTK) signal.

5. The survey device as claimed in claim 1, wherein the spatial data is a three dimensional position.

6. The survey device as claimed in claim 1, wherein the spatial data is a two dimensional position.

7. The survey device as claimed in claim 1, wherein the environmental data is selected from the group consisting of chemical data, physical data, biological data, geographical data, and geological data.

8. The survey device as claimed in claim 1, wherein the collocated data includes temporal data.

9. The survey device as claimed in claim 1, wherein the survey device includes a user display module.

10. The survey device as claimed in claim 1, wherein more than one antenna is provided.

11. The survey device as claimed in claim 10, wherein at least one of the more than one antennas is an external antenna.

12. The survey device as claimed in claim 11, wherein a Radio Frequency (RF) switch is provided for switching between internal and external antennas.

13. The survey device as claimed in claim 1, wherein the interface is able to receive the environmental data via one or more of: a cable; a serial cable; a parallel cable; an optical fibre; a USB; a wireless data transmission protocol; bluetooth; infrared; and IEEE 802.11.

14. The survey device as claimed in claim 1, wherein the output device is able to output the collocated data via one or more of: a wireless data transmission protocol; bluetooth; infrared; IEEE 802.11; GSM; CDMA; and 3G.

15. The survey device as claimed in claim 1, wherein the output device includes a mobile phone module.

16. The survey device as claimed in claim 1, wherein the survey device is encased in a water resistant casing.

17. A computer-readable storage medium having computer-executable instructions stored thereon for controlling a handheld survey device to:
    (1) obtain data representative of at least one wireless signal, the at least one wireless signal received by an antenna;
    (2) obtain data representative of environmental data from at least one interchangeable peripheral device selected from a plurality of different types of interchangeable peripheral devices that produces the environmental data, the environmental data received by at least one interface, wherein the environmental data correlates with environmental conditions in the local vicinity of the handheld survey device;
    (3) determine spatial data using the data representative of at least one wireless signal;
    (4) combine the determined spatial data and the environmental data to produce collocated data; and,
    (5) wirelessly transmit the collocated data using an output device of the handheld survey device.

* * * * *